(12) United States Patent
Emig et al.

(10) Patent No.: US 6,395,046 B1
(45) Date of Patent: May 28, 2002

(54) DUST FILTER BAG CONTAINING NANO NON-WOVEN TISSUE

(75) Inventors: Dietmar Emig, Aschau; Albrecht Klimmek, Bruckmuhl; Ernst Raabe, Raubling, all of (DE)

(73) Assignee: FiberMark Gessner GmbH & Co., Bruckmuhl (DE)

( * ) Notice: Subject to any disclaimer, the term of this patent is extended or adjusted under 35 U.S.C. 154(b) by 0 days.

(21) Appl. No.: 09/564,379

(22) Filed: Apr. 28, 2000

(30) Foreign Application Priority Data

Apr. 30, 1999 (DE) .......................... 199 19 809

(51) Int. Cl.[7] .............................................. B03C 3/011
(52) U.S. Cl. ............................ 55/382; 55/486; 55/487; 55/DIG. 2; 15/347; 15/352
(58) Field of Search .......................... 55/382, 486, 487, 55/DIG. 2, DIG. 39; 95/57, 78, 287; 96/15, 69; 15/347, 352

(56) References Cited

U.S. PATENT DOCUMENTS

| | | | |
|---|---|---|---|
| 4,011,067 A | | 3/1977 | Carey, Jr. |
| 4,589,984 A | | 5/1986 | Gin et al. |
| 4,650,506 A | | 3/1987 | Barris et al. |
| 5,080,702 A | * | 1/1992 | Bosses .......................... 55/382 |
| 5,647,881 A | * | 7/1997 | Zhang et al. ................. 55/382 |
| 5,672,188 A | * | 9/1997 | Choi ............................ 55/486 |
| 5,672,399 A | | 9/1997 | Kahlbaugh et al. |
| 5,730,923 A | * | 3/1998 | Hassenboehler, Jr. et al. ... 264/479 |
| 5,785,725 A | * | 7/1998 | Cusick et al. ................. 55/382 |
| 5,800,706 A | | 9/1998 | Fischer |
| 6,045,595 A | * | 4/2000 | Freudenberg ................. 55/382 |
| 6,171,369 B1 | * | 1/2001 | Schultink et al. ............. 55/382 |
| 6,183,536 B1 | * | 2/2001 | Schultink et al. ............. 55/382 |

FOREIGN PATENT DOCUMENTS

| | | |
|---|---|---|
| EP | 0 338 479 B1 | 4/1989 |
| EP | 0 375 234 B1 | 12/1989 |
| EP | 0 410 733 A2 | 7/1990 |

* cited by examiner

*Primary Examiner*—David A. Simmons
*Assistant Examiner*—Minh-Chau T. Pham
(74) *Attorney, Agent, or Firm*—Scully, Scott, Murphy & Presser

(57) ABSTRACT

A dust filter bag constituted of a plurality of layers including at least one carrier material and at least one non-woven tissue layer wherein the at least one non-woven tissue layer has a nano non-woven tissue with an average fiber diameter of 10 to 1000 mm, a basis weight of 0.05 to 2 g/m$^2$ and an air permeability of 1500 to 20,000 l/m$^2$×s, and the at least one carrier material layer and an air permeability of more than 70 l/m$^2$×s, and a breaking resistance in the longitudinal direction of more than 20 N/15 mm strip width, and in the transverse direction of more than 10 N/15 mm strip width. The dust filter bag is suitable for use in vacuum cleaners for the efficient reduction of the finest dust, without the suction power of the vacuum cleaner being notably reduced.

25 Claims, No Drawings

DUST FILTER BAG CONTAINING NANO NON-WOVEN TISSUE

BACKGROUND OF THE INVENTION

1. Field of the Invention

The invention concerns a dust filter bag which has at least one non-woven tissue and at least one layer of carrier material.

The requirements for the performance of filters of the filter bags which are used in modern vacuum cleaners have been clearly increased in recent years. Above all ever greater significance is attributed to the field of the removal of fine particles, because this not only corresponds to the increased consciousness of hygiene, but—against the background of the increasing number of sufferers from allergy and in particular the number of those allergic to household dust— the exit air from the vacuum cleaner should be as far as possible composed of few allergy carriers. In order to achieve the aim of improving the deposit of fine particles, in recent years numerous efforts have been made which were aimed at the development of new materials, bag designs and filter systems. For example, three layered filter bags were produced or downstream fine particle filter elements were used as the ejection filter. The disasdvantages of these versions are either to be found in the inadequate improvement of the precipitation of the fine particles or in a strongly increased filter resistance, which leads to a reduced suction power of the device.

A major step forward in the improvement of the fine particle precipitation, a few years ago, was the development of the meltblown fine non-woven tissues and their use in special vacuum cleaner bags. These fine fiber components make possible a clear alleviation for those allergic to household dust due to the purer blow out air of the vacuum cleaner. Thus today in the United States, already about 25% of the dust filter bags are produced with a meltblown fiber layer, with increasing tendency.

2. Discussion of the Prior Art

The basic structure of such bags is shown in patents DE 38 12 849, U.S. Pat. Nos. 5,080,702 and 4,589,894. As is disclosed in DE 38 12 849, such meltblown fiber layers have typically a fiber diameter of 0.5 to 18 microns, a basic weight of 10 to 50 g/m$^2$, and an air permeability of 200 to 1500 l/m$^2$xs. However, from the view point of today, these dust filter bags have a disadvantage: although a high filter precipitation performance is achieved, these technologies have their limits to the extent that further improvement of the finest particle precipitation inevitably makes it necessary to increase the basis weight of the fine particle filter layer, which simultaneously has a strongly negative influence on the filter resistance and therefore on the suction power of the devices. These negative effects increase to the same extent as the precipitation of the finest particles is improved. In addition, due to the increase in the basis weight of the meltblown layer for the improvement of the finest particle precipitation, the processing of these filter combinations is complicated, because the meltblown layer, due to its structure, causes strong reset forces, which complicate the folding of the filter laminate to form a flat dust filter bag, particularly in the zone of the wound base which closes the bag.

A different technology, which is used above all in Europe because of the different design features of the European vacuum cleaner, includes the concept of the micro exhaust filter, which is downstream from the dust filter bag on the exhaust air side. High quality exhaust air filters meanwhile consist of cassette designs with pleated filter elements. The technical drawback of these extensive versions is also to be found in an increased filter resistance for the totality of the filter system, in comparison with systems without micro exhaust air filters, of filter bags and exhaust air filters, whereby in this case as well the suction power of the devices is strongly adversely affected. In addition there is the fact that due to the dust throughput degree of the filter bag, the stoppage degree of the downstream exhaust air filter increases with increasing time in use, whereby an additional adverse effect results for the suction power of the device. In order to exclude these disadvantages, multifareous tests have been made, to adjust the precipitation power of the filter system above all for fine particles to the high level which has been achieved and at the same time clearly to reduce the adverse effect on the suction power, but until now without the desired success.

SUMMARY OF THE INVENTION

The invention is based on the object of producing a dust filter bag with an especially good degree of dust precipitation for the finest particles below 0.5 microns in size, which at the same time has a low initial filter resistance and a small tendency to stoppage, whereby a high suction power of the vacuum cleaner remains, even with increasing filling of the dust filter bag during use.

In accordance with the invention, the object is attained by a dust filter bag which has at least one layer of carrier material and at least one non-woven tissue layer, in which the at least one layer of non-woven tissue has a nano non-woven tissue layer with an average fiber diameter of 10 to 1000 nm, preferably 50 to 500 nm, a basis weight (ISO 536) from 0.05 to 2 g/m$^2$, preferably from 0.2 to 0.5 g/m$^2$, and an air permeability (ISO 9237) of 1500 to 20000 l/m$^2$xs, preferably from 2000 to 10000 l/m$^2$xs, and the at least one carrier material layer has an air permeability (ISO 9237) of more than 70 l/m$^2$xs, preferably from 200 to 900 l/m$^2$xs, a breaking resistance (ISO 1924-2) in the longitudinal direction of more that 20 N/15 mm strip width, preferably of more than 35 N/15 mm strip width, and in the transverse direction of more than 10 N/15 mm strip width, preferably of more than 18 N/15 mm strip width.

The term which is used here "nano fibers" makes it clear that the fibers have a diameter in the nano meter range, specially from 10 to 1000 nm, preferably from 50 to 500 nm.

The nano non-woven tissue which is used in accordance with the invention consists due to the production process usually of soluble or thermoplastic polymers, which are soluble in water and in an organic solvent.

Special preference is given to polymers soluble in water such as polyvinyl alcohol, polyvinyl pyrolidon, polyethylene oxide or copolymers thereof, cellulose, methyl cellulose, propyl cellulose, starch or mixtures thereof.

The polymers specially preferred which are soluble in an organic solvent are polystyrene, polycarbonate, polyamide, polyurethane, polyacrylate, polymethacrylate, polyvinyl acetate, polyvinyl acetal, polyvinyl ether, cellulose acetate or copolymers or mixtures thereof.

Specially preferred thermoplastic polymers are polyethylene, polypropylene, polybutene-1. polymethyl pentene, polychloro trifluoroethylene, polyamide, polyester, polycarbonate, polysulfon, polyether sulfon, polyphenylene sulfide, polyacryl nitrile, polyvinyl chloride, polystyrene, polyaryl ether keton, polyvinylene flouride, polyoxy methylene, polyurethane or copolymers or mixtures thereof.

The nano non-woven tissue which is the decisive component for a high degree of precipitation of finest dust is preferably produced in that a thermoplastic polymer is spun in the molten state or a polymer dissolved in a suitable solvent is spun from nozzles in a strongly electrical field to form the finest fibers and on a substrate which is guided past a counter electrode it is deposited in the form of a planar structure. This process is known as the electro spinning process. The diameter of the fibers can be controlled by the process parameters, namely the viscosity of the melt in the case of thermoplasts and/or the concentration and viscosity of the polymer solution. The basis weights of the nano non-woven tissue are determined on the one hand by the mass flow through the nozzles and on the other by the speed at which the substrate is moved under the nozzles. The air permeability of the nano non-woven tissue is influenced by the thickness of the fibers and by their packing density.

The production of nano fibers from various polymers is described by Darell H. Reneker and Iksoo Chun in the publication "Nanometre diameter fibres of polymer, produced by electrospinning", Nanotechnology 7, 1996, pages 216 to 223.

Because the nano non-woven tissue which is used in accordance with the invention has a low strength due to its very low basis weight and further processing as a self-supporting planar structure can be difficult, it is preferably directly precipitated on its generation onto the carrier material layer and/or onto an additional support element of the dust filter bag, forming a two-layered composit.

DETAILED DESCRIPTION OF PREFERRED EMBODIMENTS

In a preferred embodiment of the dust filter bag in accordance with the invention, the carrier material layer consists of a spun non-woven tissue. Preferably the spun non-woven tissue has a basis weight (ISO 536) of 15 to 100 $g/m^2$, with special preference for 20 to 40 $g/m^2$. In addition it is also an advantage when the spun non-woven tissue has an air permeability (ISO 9237) of 100 to 8000 $l/m^2{\times}s$, with special preference for 100 to 3000 $l/m^2{\times}s$. Preferably the spun non-woven tissues which are used consist of polyethylene, polypropylene, polyester, polyamide or copolymers thereof.

The physical properties above of the non-woven tissue can be adjusted during the production process for it in that a thermoplastic polymer is molten in an extruder and is pressed through a spinning nozzle, and the endless filaments formed in the capillaries of the spinning nozzle are stretched and deposited on a screen to form a planar structure. The basis weight of the non-woven tissue can be adjusted via the polymer ejection from the spinning nozzle and by the speed of the deposit screen. The air permeability of the non-woven tissue is dependent on the packing density, which is controlled substantially by the thickness of the filament. The adjustment of the diameter of the filament is carried out by stretching the melt yarns, which is controlled by the temperature control and the offtake speed during spinning. The breaking resistance of the spun non-woven tissue is determined by the materials which are chosen for the production of the non-woven tissue. Optionally the breaking resistance can be increased by partial calendration or by ultrasonic welding with the formation of dot or lattice patterns. In this connection, the filaments are molten with each other at the intersection points. But the non-woven tissue can be further strengthened by compression over the whole area by means of a calender.

In a further preferred embodiment, as the carrier material layer, filter paper is used in the dust filter bags in accordance with the invention. Preference is given to a filter paper with a basis weight (ISO 536) of 40 to 90 $g/m^2$, with special preference for 42 to 60 $g/m^2$. In addition, filter papers are advantageous which have an air permeability (ISO 9237) between 70 and 900 $l/m^2{\times}s$, with special preference for between 120 and 400 $l/m^2{\times}s$. Moreover a filter paper with a breaking resistance (ISO 1924-2) in the longitudinal direction of 25 to 70 N/15 mm strip width and in the transverse direction of 15 to 45 N/15 mm strip width is advantageous. Especially suitable filter papers for use as a carrier material layer consist of:

long and short fiber cellular substances or
 mixtures of long and short fiber cellular substances with synthetic fibers or
 mixtures of long and short fiber cellular substances with glass fibers or
 mixtures of long and short fiber cellular substances with synthetic fibers and glass fibers.

The above physical parameters of the filter paper can be adjusted during paper production. In the production of the paper, conventionally the fibers which are used are dispersed in water, then separated by means of a screen from water and at the same time a planar structure is formed. The wet paper sheet which is formed is then dried. The basis weight of the filter paper can be adjusted by the dosed amount of the fibers and by the paper machine speed. The air permeability of the filter paper is determined by the packing density, the different fiber diameter of the cellulose which is used, synthetic fibers and/or glass fibers as well as by the mix ratio of the various fiber types. The basis weight also has an influence on the air permeability, i. e. increasing basis weight reduces the air permeability. The breaking resistance of the filter paper can be controlled by fibrillation, so called grinding of the cellulose and by the introduction of bonding agents. In this context, the bonding agents can be impregnated or sprayed on the paper sheet. Then the solvent or dilution agent of the binder, which in most cases is water, is evaporated and the paper sheet is again dried. The bonding agents can also be inserted in the paper mass, i. e. the solidification agents are added to the dispersed fibers and are fixed on the fiber surface, before the sheet formation is carried out on the screen of the paper machine and then the sheet is dried in the usual way. A further possibility is to spray the bonding agent in dissolved or dispersed form ont the wet paper sheet, before the sheet is dried.

In a preferred embodiment of the dust filter bag in accordance with the invention, the support element is a non-woven tissue.

As the non-woven tissues which are suitable as a support element, e. g. dried non-woven tissues, wet non-woven tissues or spun non-woven tissues can be used, which can be produced from cellulose, synthetic fibers and/or filaments or mixtures thereof.

Another preferred embodiment of the dust filter bag contains meltblown non-woven tissues as the support element, which can be produced from a thermoplastic material, preferably from polyolefin, polyamide, polyester, polycarbonate or copolymers or mixtured thereof.

The meltblown non-woven tissues consist in general of long, fine fibers of non uniform diameter and can be produced in a meltblow process (e. g. the Exxon process). To do this the thermoplastic material is melted in an extruder, transported by a spinning pump through the capillaries of the meltblown spinning nozzles and is stretched on exit with hot air and placed in sheet form on a collector screen.

In a preferred embodiment the support element is a dried non-woven tissue with a basis weight (ISO 536) of 10 to 50 g/m², preferably 20 to 30 g/m², a thickness (ISO 534) of 0.10 to 2.0 mm, preferably 0.20 to 1.0 mm, an air permeability (ISO 9237) of 700 to 12000 l/m²×s, preferably 1200 to 5000 l/m²×s, and a breaking resistance (ISO 1924-2) in the longitudinal direction of more than 5 N/15 mm strip width and in the transverse direction of more than 1 N/15 mm strip width.

The above named physical properties can be adjusted during the production of the dried non-woven tissues. The basis weight can be controlled by the number and/or amount of the fibers and by the speed of the deposit aggregate. The air permeability can be adjusted by the diameter of the fibers, the type of fibers, smooth or crimped, by the mixing of different fiber types and by the density of the packing. The packing density, in this context, is adjusted by the deposit process and by the further treatment of the sheet, e. g. by compressing, by needling, mechanical pressing between rollers. To adjust the breaking resistance, spraying or impregnation of the fibers with bonding agents is suitable. In addition, thermobonding of thermoplastic fibers which are introduced during production with subsequent heat treatment of the sheet is suitable to adjust the breaking resistance.

In accordance with another advantageous embodiment, the support element is wet non-woven tissue with a basis rate (ISO 536) of 6 to 40 g/m², preferably 10 to 20 g/m², a thickness (ISO 534) of 0.05 to 0.35 mm, preferably 0.08 to 0.25 mm, an air permeability (ISO 9237) of 500 to 4000 l/m²×s, preferably 700 to 2000 l/m²×5, and a breaking resistance (ISO 1924-2) in the longitudinal direction of more than 58 N/15 mm strip width and in the transverse direction of more than 2 N/15 mm strip width.

Wet non-woven tissues are produced in the same way as the filter papers which are described above. The physical parameters of the wet non-woven tissues can also be adjusted in the same way as for the filter papers.

In addition, a spun non-woven tissue can be seen as specially suitable as the support element with a basis weight (ISO 536) of 8 to 40 g/m², preferably 13 to 25 g/m², a thickness (ISO 534) of 0.05 to 0.30 mm, preferably 0.07 to 0.20 mm, an air permeability (ISO 9237) of 700 to 12000 l/m²×s, preferably 1200 to 5000 l/m²×s, and a breaking resistance (ISO 1924-2) in the longitudinal direction of more than 7 N/15 mm strip width and in the transverse direction of more than 3 N/15 mm strip width.

Lastly a further preferred embodiment of the support element consists of a meltblown non-woven tissue with a basis weight (ISO 536) of 6 to 60 g/m², preferably 10 to 25 g/m², a thickness (ISO 534) of 0.06 to 0.50 mm, preferably 0.23 to 0.35 mm, an air permeability (ISO 9237) of 300 to 2000 l/m²×s, preferably 500 to 1200 l/m²×s, and a breaking resistance (ISO 1924-2) in the longitudinal direction of more than 2 N/15 mm strip width and in the transverse direction of more than 1 N/15 mm strip width.

The above product features of the meltblown non-woven tissues can be adjusted as follows during their production. The basis weight is controlled by the polymer output and the speed of the deposit screen. The air permeability results from the packing density of the fibers, which in its turn is controlled by the fiber diameter and by the impact energy of the fibers on the deposit screen. The thickness of the meltblown non-woven tissues is adjusted by the fiber diameter, by the ratio of polymer speed on exit from the capillaries and the air speed of the blown air and by the resultant degree of extention of the filaments. Moreover, the degree of extention of the filaments and therefore of the fiber diameter, the packing density and the air permeability of the non-woven tissues can be influenced by the temperatures of the polymer melt and of the blown air. The impact energy of the fibers on the deposit screen can be controlled by the blown air speed and the spacing between the meltblown nozzle and the deposit screen. To influence the breaking resistance, the fibers can be partially welded, e. g. in the form of a dot or lattice pattern. Furthermore it is also possible to introduce bonding agents by impregnation or by spraying to increase the strength.

In one preferred embodiment, such layers are exclusively used for the structure of the dust filter bag in accordance with the invention, which consist of materials insoluble in water. Materials which swell under the influence of water can also be used for this purpose, to the extent that during swelling their carrier, support and/or filter function is not lost. Dust filter bags which consist exclusively of water insoluble materials are suitable for wet and dry applications.

In a preferred embodiment of the dust filter bag, the carrier material layer is the outside and the support element is the inner onstream side of the dust filter bag, in which the nano non-woven tissue layer which is deposited on the support element with the formation of a two-layered composit faces the carrier material layer.

In another embodiment of the dust filter bag in accordance with the invention, the carrier material layer is outside and the support element is the inner onstream side of the dust filter bag, in which the nano non-woven tissue layer deposited on the support element with the formation of a two-layered composite faces away from the carrier material layer.

In accordance with a further embodiment in accordance with the invention of the dust filter bag, the carrier material layer forms the outside and the support element is the inner onstream side of the dust filter bag, in which both on the carrier material layer as well as on the support element, respectively one layer of nano non-woven tissue is deposited with the formation of a two-layered compound.

In this context the dust filter bag can be designed so that the nano non-woven tissue layer deposited on the support element faces away from the carrier material layer and the nano non-woven tissue layer which is deposited on the carrier material layer faces towards the support element.

In addition, the dust filter bag can also be designed so that the nano non-woven tissue layer deposited on the support element faces away from the carrier material layer and the nano non-woven tissue layer deposited on the carrier material layer faces away from the support element.

In this context preference is given to those dust filter bags in which the nano non-woven tissue layer deposited on the support element faces the carrier material layer and the nano non-woven tissue layer deposited on the carrier material layer faces the support element.

In addition, those dust filter bags are suitable in which the nano non-woven tissue layer deposited on the support element faces the carrier material layer and the nano non-woven tissue layer deposited on the carrier material layer faces away from the support element.

Finally a further preferred embodiment of the dust filter bag in accordance with the invention is provided in that the carrier material layer forms the exterior and the support element forms the internal onstream side of the dust filter bag, in which both on the two sides of the carrier material layer as well as on the two sides of the support element, respectively one layer of nano non-woven tissue is deposited with the respective formation of a three-layered composit.

Below the preferred layer arrangements are shown again in detail.

| Onstream side (internal) -> | -> exhaust air side (exterior) |
|---|---|
| support element/nano non-woven tissue | -> carrier |
| nano non-woven tissue/support element | -> carrier |
| nano non-woven tissue/support element | -> nano non-woven tissue/carrier |
| support element/nano non-woven tissue | -> carrier/nano non-woven tissue |
| support element/nano non-woven tissue | -> nano non-woven tissue/carrier |
| support element/nano non-woven tissue | -> carrier/nano non-woven tissue |
| nano non-woven tissue/support element/ nano non-woven tissue | -> nano non-woven tissue/carrier/nano non-woven tissue |

In the list above, the individual layers are listed in the sequence from the onstream side. Consequently the arrows symbolize the direction of flow of the air.

For the production of raw and finished bags from the filter compositions in accordance with the invention, the processes known per se can be used.

These production processes usually comprise two working steps, which are carried out on separate machine aggregates:
 a) production of the raw bag
 b) confectioning to form the finished bag.

For the production of the raw bag, the layer or the two-layered composite which are to form the outer layer in the dust filter bag are sent in rolled form to the bag machine. From an unwinding station, this sheet is drawn into the machine with the application of a constant tension and is formed into a tube, which is closed by a longitudinal seam. Then the tube is cut to the corresponding length and one of its ends is closed to form a base. This is done on the base folding drum by the formation of a loop, which is turned over and glued on each other. The raw bag machine is provided with a feed device for the layers, which are to come to rest in the interior of the dust filter bag. The sheets of these layers are supplied to the existing sheet of the outer layer before the formation of the tube. Thereby one obtains a bag in a bag. The raw bag which is obtained thereby is provided on the separate confectioning machine with a holder plate which corresponds to the intended model of vacuum cleaner and in fact usually on the previously formed joint bar (the specialist expression=tuber bottomer). The second end of the tube which is still open is closed in the form of a wound base by crimping and glueing the tube.

The dust filter bags in accordance with the invention can be used for the effective precipitation of the finest dusts in the most varied vacuum cleaners, in which the suction power is not reduced by comparison with conventional devices. There are no restrictions as to the size and form of the filter bags. They are therefore suitable for industrial, floor and hand vacuum cleaners. The focal point might well be the effective removal of allergenic household dust.

Description of the Test Methods

Below the characterisation methods for the filter materials and components are listed:

| Basis weight: | EN ISO 536 (G/m$^2$) |
|---|---|
| Thickness: | EN ISO 534, key pressure: 20 kPa (mm) |
| Air permeability: | EN ISO 9237 (l/m$^2$xs) |

The air permeability of the nano non-woven tissues was calculated using the formula below, because these tissues do not have enough mechanical strength as the only layer for this measurement method.
$1/LD_{NFV} = 1/LD_V - 1/LD_T$ In this formula, LD represents the air permeability, NFV stands for the nano non-woven tissue, V for the two-layer composite of nano non-woven tissue and support element or nano non-woven tissue and carrier material layer and T represents the carrier in this two-layered composite, either as the support element or as the carrier material layer.

| Breaking resistance: | EN ISO 1924-2 (N/15 mm strip width) |
|---|---|
| Fiber diameter: | light and raster electronic microscopy; comparison of the fiber diameter with the reflected measurement scale |

Degree of Dust Passage and Filter Resistances
Palas, described in:
 a) W. Willemer, W. Mölter, Praxisnahe Überprüfung von Staubfiltern, Chemietechnik 15 (1986) volume 12, pages 20 to 26
 b) W. Mölter, C. Helsper, Fast and Automated Testing of Filter Media, Filtech Conference, Sep. 23 to 25, 1987, Utrecht/Netherlands

| Onstream speed: | 25 cm/second |
|---|---|
| Test air: | 200 mg test dust per cubic meter |
| Test dust: | SAE fine, particle size distribution: 0–80 microns |
| Dusting time: | 10 minutes |
| Particle count: | Palas PCS 2000; measurement range 0.25 to 10 microns |

Evaluated particle fraction to determine the degree of dust passage: 0.25 to 0.30 microns, average of 10 minutes dusting.

| Filter resistance p1: | filter resistance before dusting |
|---|---|
| Filter resistance p2: | filter resistance after dusting This value is the yardstick for the tendency to stoppage and downtime of the filter, because the suction power of the vacuum cleaner is directly dependent on it. |

The following examples 1 to 3 show the outstanding technical filter properties of the filter combinations in accordance with the invention by comparison with filter materials which are conventional in dust filter bags.

EXAMPLE 1

A 7% solution of polyvinyl alcohol with an average molecular weight of 200 000 and a saponification degree of 98% was spun through a capillary of 0.8 mm in a DC field with 30 kV voltage between capillary and the earthed counter electrode to form nano fibers. The spacing between capillary and counter electrode was 6 cm. The nano non-woven tissue was deposited on a polypropylene meltblown material which was located on the counter electrode. The average fiber diameter of the nano non-woven tissue was about 380 nm, the computed air permeability was 4200 l/m²×s.

For testing the capacity for dust precipitation by using the test methods described above, the meltblown layer on which the nano non-woven tissue was deposited with the formation of a two-layered composit was applied on an external carrier material layer of filter paper, so that the nano fiber layer came to rest between the carrier and the meltblown layer.

The following table shows the results of testing.

|  |  | filter paper layer | nano fiber layer | meltblown layer | combination |
|---|---|---|---|---|---|
| Basis weight | g/m² | 45 | 0.1 | 23 | 68.1 |
| Thickness | nm |  | 0.17 |  |  |
| Break resistance longitudinally | N | 40 |  |  |  |
| Break resistance transversely | N | 24 |  |  |  |
| Air permeability | l/m²×s | 280 | 4200 | 750 | 195 |
| Dust passage (0.25–0.30 microns) | % |  |  |  | 1.94 |
| Filter resistance p1 | Pa |  |  |  | 305 |
| Filter resistance p2 | Pa |  |  |  | 870 |

Reference Example 1

The meltblown layer of example 1 was applied without nano non-woven tissue deposited on it on the outer layer of the filter paper of example 1 and this filter system was investigated with the test methods described above with respect to its dust precipitation capacity.

The table below summarizes the results of testing.

|  |  | Filter paper layer | Meltblown layer | Combination |
|---|---|---|---|---|
| Basis weight | g/m² | 45 | 23 | 68 |
| Thickness | mm | 0.17 |  |  |
| Break resistance longitudinally | N | 40 |  |  |
| Break resistance transversely | N | 24 |  |  |
| Air permeability | l/m²×s | 280 | 750 | 200 |
| Dust passage (0.25–0.30 microns) | % |  |  | 4.36 |
| Filter resistance p1 | Pa |  |  | 300 |
| Filter resistance p2 | Pa |  |  | 857 |

On comparison with the reference material, it becomes clear that by a nano non-woven tissue layer with a basis weight of 0.1 g/m², the dust passage for particles of 0.25 to 0.30 microns in size is reduced from 4.36 to 1.94 without the filter resistances being significantly altered. This corresponds to a reduction of these fine dust particles in the filtered air by about 55%.

EXAMPLE 2

In accordance with the process described in example 1, a nano non-woven tissue of polyvinyl alcohol was deposited on a polypropylene meltblown tissue. The average fiber diameter of the nano non-woven tissue was about 400 nm, the computed air permeability was 7400 l/m²×s.

For testing the dust precipitation capacity when using the test methods described above, the meltblown layer on which the nano non-woven tissue was deposited forming a two-layered composit, was applied on a spinning non-woven tissue layer on polypropylene, so that the nano non-woven tissue formed the onstream layer of the filter system.

The following table shows the results of testing.

|  |  | spinning tissue layer | meltblown layer | nano tissue layer | combination |
|---|---|---|---|---|---|
| Basis weight | g/m₂ | 30 | 36 | 0.1 | 66.1 |
| Thickness | mm |  | 0.25 |  |  |
| Break resistance longitudinally | N | 18 |  |  |  |
| Break resistance transversely | N | 7 |  |  |  |
| Air permeability | l/m²×s | 3500 | 400 | 7400 | 345 |
| Dust passage (0.25–0.30 microns) | % |  |  |  | 0.44 |
| Filter resistance p1 | Pa |  |  |  | 135 |
| Filter resistance p2 | Pa |  |  |  | 545 |

Reference Example 2

The meltblown layer of example 2 was applied without the nano non-woven tissue deposited on it on the external layer of spinning tissue of example 2 and this filter system was investigated with respect to its capacity for dust precipitation using the test methods described above.

The table below summarizes the results of testing.

|  |  | Spinning tissue layer | Meltblown layer | Combination |
|---|---|---|---|---|
| Basis weight | g/m² | 30 | 36 | 66 |
| Thickness | mm | 0.25 | 0.32 |  |
| Break resistance longitudinally | N | 18 |  |  |
| Break resistance transversely | N | 7 |  |  |
| Air permeability | l/m²×s | 3500 | 400 | 355 |
| Dust passage (0.25–0.30 microns) | % |  |  | 2.66 |
| Filter resistance p1 | Pa |  |  | 125 |
| Filter resistance p2 | Pa |  |  | 540 |

Due to the nano non-woven tissue of the dust bag in accordance with the invention in example 2, with practically constant filter resistances, the passage of particles of the size 0.25–0.30 microns was reduced from 2.66 to 0.44%. This corresponds to a reduction of the fine dust particles in the filtered air of about 83%.

EXAMPLE 3

Using the process described under example 1 a nano non-woven tissue of polyvinyl alcohol was deposited on a support element of cellulose produced in accordance with the wet process. The average fiber diameter of the nano non-woven tissue was about 420 nm, the computed air permeability was 2800 l/m²×s.

For testing the capacity for dust deposit when using the test methods described above, the support element on which the nano non-woven tissue was deposited with the formation of a two-layered composit, was applied on a filter paper outer layer so that the nano non woven tissue came to rest between the outer carrier and the support element.

The following table summarizes the results of testing.

|  |  | Paper carrier | Nano non-woven tissue | Support element | Combination |
|---|---|---|---|---|---|
| Basis weight | g/m² | 45 | 0.3 | 18 | 63.3 |
| Thickness | mm | 0.17 |  |  |  |
| Break resist. longitudin. | N | 40 |  |  |  |
| Break resist. transversely | N | 24 |  |  |  |
| Air permeab. | l/m²×s | 280 | 2800 | 1500 | 210 |
| Dust passage (0.25–0.30 microns) | % |  |  |  | 8.95 |
| Filter resist. p1 | Pa |  |  |  | 230 |
| Filter resist. p2 | Pa |  |  |  | 1425 |

Reference Example 3

The support element layer of example 3, without the nano non-woven tissue deposited on it was applied on the outer filter paper layer of example 3 and this filter system was investigated with the test reference described above with respect to its capacity for dust precipitation.

The table below summarizes the results of testing.

|  |  | Paper carrier | Support element | Combination |
|---|---|---|---|---|
| Basis weight | g/m² | 45 | 18 | 63 |
| Thickness | mm | 0.17 |  |  |
| Break resistance longitudinally | N | 40 |  |  |
| Break resistance transversely | N | 24 |  |  |
| Air permeability | l/m²×s | 280 | 1500 | 235 |
| Dust passage (0.25–0.30 microns) | % |  |  | 27.89 |
| Filter resistance p1 | Pa |  |  | 200 |
| Filter resistance p2 | Pa |  |  | 1420 |

Due to the nano non-woven tissue which was applied on the paper carrier, the dust passage for particles between 0.25 to 0.30 microns was reduced to 8.95% from 27.89%. This corresponds to a reduction of about 68%. The nano non-woven tissue which was applied increased the filter resistance of the undusted filter (p1) only slightly, whereas the filter resistance of the dusted filter (p2) was almost unchanged.

The examples above show that the use of specific nano non-woven tissues in dust filter bags has the effect that the finest particles are efficiently retained in the size range from 0.25 to 0.3 microns, without thereby increasing the filter resistance p2. The suction performance of the vacuum cleaner remained despite the clear improvement in the degree of precipitation almost unchanged by comparison with the reference examples.

What is claimed is:

1. A dust filter bag comprising a plurality of layers constituted of at least. one layer of a carrier material and at least one non-woven tissue layer, said at least one non-woven tissue layer being a nano non-woven tissue layer with an average fiber diameter of 10 to 1000 nm, a basis weight of about 0.05 to 2 g/m², and an air permeability of about 1500 to 20,000 l/m², l/m²×s, and wherein said at least one carrier material layer has an air permeability of greater than 70 l/m²×s, a breaking resistance in a longitudinal direction of the layer of greater than 20 N/15 mm strip width and in a transverse direction of more than 10 N/15 mm strip width.

2. A dust filter bag in accordance with claim 1, wherein the nano non-woven tissue layer is directly deposited on the carrier material layer so as to form a two-layered composite therewith.

3. A dust filter bag in accordance with claim 1 or 2, wherein a support element has the nano non-woven tissue layer deposited so as to form a two-layered composite therewith.

4. A dust filter bag in accordance with claim 1, wherein the carrier material layer consists of a spun non-woven tissue.

5. A dust filter bag in accordance with claim 4, wherein the spun non-woven tissue has a basis weight of about 15 to 100 g/m².

6. A dust filter bag in accordance with claim 4 or 5, wherein the spun non-woven tissue has an air permeability of about 100 to 8000 l/m²×s.

7. A dust filter bag in accordance with claim 1, wherein the carrier material layer consists of filter paper.

8. A dust filter bag in accordance with claim 7, wherein the filter paper has a basis weight of about 40 to 90 g/m².

9. A dust filter bag in accordance with claim 7 or 8, wherein the filter paper has an air permeability of about 70 to 900 l/m²33 s.

10. A dust filter bag in accordance with claim 7, wherein the filter paper has a breaking resistance in a longitudinal direction the paper of about 25 to 70 N/15 mm strip width and in a transverse direction of about 15 to 45 N/15 mm strip width.

11. A dust filter bag in accordance with claim 3, wherein the support element consists of a non-woven tissue.

12. A dust filter bag in accordance with claim 11, wherein the non-woven tissue of the support element is selectively a dried non-woven tissue, a wet non-woven tissue, a spun non-woven tissue or a meltblown non-woven tissue.

13. A dust filter bag in accordance with claim 12, wherein the dried non-woven tissue has a basis weight of about 10 to 50 g/m², a thickness of about 0.1 to 2.0 mm, an air permeability of about 700 to 12,000 l/m²×s and a breaking resistance in the longitudinal direction of greater than 5 N/15 mm strip width and in the transverse direction of greater than 2 N/15 mm strip width.

14. A dust filter bag in accordance with claim 12, wherein the wet non-woven tissue has a basis weight of about 6 to 40 g/m², a thickness of about 0.05 to 0.35 mm, an air permeability of about 500 to 4000 l/m²×s, and a breaking resistance in the longitudinal direction of grater than 5 N/15 mm strip width and in the transverse direction of greater than 2 N/15 mm strip width.

15. A dust filter bag in accordance with claim 12, wherein the spun non-woven tissue has a basis weight of about 8 to 40 g/m², a thickness of about 0.05 to 0.30 mm, an air permeability of about 700 to 12,000 l/m²×s, and a breaking resistance in the longitudinal direction of greater than 7 N/15 mm strip width and in the transverse direction of greater than 3 N/15 mm strip width.

16. A dust filter bag in accordance with claim 12, wherein the meltblown non-woven tissue has a basis weight of about 6 to 60 g/m², a thickness of about 0.06 to 0.50 mm, an air permeability of about 300 to 2000 l/m²×s, and a breaking resistance in the longitudinal direction of greater than 2 N/15 mm strip width and in the transverse direction of greater than 1 N/15 mm strip width.

17. A dust filter bag in accordance with claim 3, wherein the carrier material layer forms the outside and the support element forms an inner onstream side of the dust filter bag, the nano non-woven tissue layer in the two-layered composite with the support element facing towards the carrier material layer.

18. A dust filter in accordance with claim 3, wherein the carrier material layer forms the outside and support element forms an inner onstream side of the dust filter bag, the nano non-woven tissue layer in the two-layered composite with the support element facing away from the carrier material layer.

19. A dust filter bag in accordance with claim 3, wherein the carrier material layer forms the outside and the support element forms an inner onstream side of the dust filter bag, wherein on both the carrier material layer and on the support element, there is deposited respectively one layer of nano non-woven tissue so as to form a two-layered composite.

20. A dust filter bag in accordance with claim 19, wherein the nano non-woven tissue layer which is deposited on the support element faces away form the carrier material layer, and the nano non-woven tissue layer which is deposited on the carrier material layer faces towards the support element.

21. A dust filter bag in accordance with claim 19, wherein the nano non-woven tissue layer deposited on the support element faces away from the carrier material layer, and the nano non-woven tissue layer which is deposited on the carrier material layer faces away from the support element.

22. A dust filter bag in accordance with claim 19, wherein the nano non-woven tissue layer which is deposited on the support element faces the carrier material layer, and the nano non-woven tissue layer which is deposited on the carrier material layer faces towards the support element.

23. A dust filter bag in accordance with claim 19, wherein the nano non-woven tissue layer which is deposited on the support element faces towards the carrier material layer, and the nano non-woven tissue layer which is deposited on the carrier material layer faces towards the support element.

24. A dust filter bag in accordance with claim 3, wherein the carrier material layer forms the outside and the support element forms an inner onstream side of the dust filter bag, wherein on both sides of the carrier material layer and on both sides of the support element, there is deposited respectively, one layer of nano non-woven tissue so as to form respectively a three-layered composite.

25. A dust filter bag in accordance with claim 1, wherein each of the layers consist of materials which are insoluble in water.

* * * * *